United States Patent Office 3,510,445
Patented May 5, 1970

3,510,445
FORTIFIED PHENOLIC RESINS
Earl H. Rosenbrock, Auburn, and James D. Doedens, Midland, Mich., assignors to The Dow Chemical Company, Midland, Mich., a corporation of Delaware
No Drawing. Filed Apr. 1, 1965, Ser. No. 444,804
Int. Cl. C08g 51/04, 5/06
U.S. Cl. 260—38          11 Claims

ABSTRACT OF THE DISCLOSURE

Fusible phenol-aldehyde resins are fortified with alkoxymethyl diaryl oxides wherein the aryl group is a hydrocarbon of the benzene series and the alkyl group is a hydrocarbon having from 1 to 4 carbons. The fortified resins have improved flexibility and toughness as well as higher resistances to shock, chemical attack and high temperatures.

---

The present invention relates to novel methods and compositions in the phenolic resin art. More particularly, the invention concerns the use of certain aromatic compounds to fortify soluble, intermediate phenolic resinoids whereby thermoset products of such resinoids are obtained with improved flexibility and toughness. The thermoset products are also improved with respect to their chemical resistance and stability at elevated temperatures.

Soluble, phenolic resinoids are often used as binders in varnishes and molding compositions. In such applications, the resinoids may be modified with chemical adjuvants in order to improve one or more properties of the finally cured resin product. Illustratively, it is known to incorporate rubber into thermoset phenolic resin bodies to increase their toughness and resistance to shock. Other additaments include various proteins, waxes, and gums, which increase the flexibility of the thermoset resins. While the indicated additions are but a few of the many attempts that have been made to change the fundamental properties of thermoset phenolic resins, there still remains today a need for further improvement in the properties of these resins.

It has now been unexpectedly discovered that soluble, fusible phenolic resinoids can be most advantageously fortified with certain unique aromatic compounds to produce improved resins. These improved resins have excellent flexibility and toughness as well as high resistances to sock, chemical attack and high temperatures. A most singular feature of the present invention is that, not only is a significant improvement achieved in each of the aforementioned properties, but such improvements are achieved simultaneously.

As employed herein, the word "fortified" refers to the addition of the described adjuvants of the invention to either the intermediate, soluble phenolic resinoid or the initial reaction charge from which such resinoids are prepared. In any event, a fortified intermediate phenolic resinoid is obtained which, under proper conditions, can be heat treated to provide a final fused product of improved properties.

The invention resides, at least in part, in a composition comprising an intimate admixture of a soluble, fusible phenolic resin system and an alkoxymethyl diaryl oxide having an average of from 1 to 4 alkoxymethyl substituents. The phenolic resin systems useful herein include fusible compositions of a phenol and an aldehyde as well as partial condensation products of the same. The diaryl oxides described above are characterized by the formula:

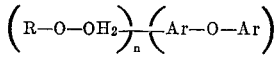

wherein R is an alkyl hydrocarbon group having 1 to 4 carbon, $n$ is a number from 1 to 4 and Ar is an aromatic hydrocarbon group of the benzene series having up to 14 carbons. It is to be understood that mixtures of isomers are contemplated as well as the individual isomers and that the aforementioned value range for $n$ is intended to represent an average number of alkoxymethyl groups per diaryl oxide nucleus.

The preferred diaryl oxide derivative is characterized by the following formula:

wherein R is an alkyl group as described above.

Said diaryl oxide derivatives are employed in an amount from about 0.2 to 9 parts, preferably from about 1.5 to about 4.0 parts thereof, for each part of the phenolic resin system.

When the diaryl oxide derivatives are incorporated into the phenolic resin system as an initial coreactant with the phenol and the aldehyde, the relative proportions of the phenol and aldehyde used are those employed in preparing fusible resins. From about 0.6 to 2.5 moles of the aldehyde can be employed for each mole of the phenol. Specific phenols include phenol, cresol resorcinol, 3,5-xylenol, ethyl phenol, butyl phenol and phenyl phenol. In general any phenol with at least 3 active ring positions can be used.

Since the diaryl oxide derivatives are not water soluble, initial condensation reactions are best carried out in the presence of an organic solvent employing an essentially anhydrous aldehydic material, e.g., para formaldehyde. Other suitable aldehydic materials include trioxymethylene, acetaldehyde, and furfuraldehyde. Reaction temperatures employed vary from about 60° C. to 140° C. Reaction times at these temperatures will be from about 10 minutes to 1 or 2 hours or more. In any event, time and temperature are controlled to produce an intermediate, soluble, thermosetting resinoid.

If the phenolic resin system has been partially condensed prior to adding the described diaryl oxide derivatives, incorporation of the derivative is achieved by any of several conventional techniques. One technique involves blending the dry phenol aldehyde reaction product with the liquid diaryl oxide derivative. Another mode for producing uniform blends of the resin components involves dispersing them in an organic medium which is a solvent for the phenolic resinoid and a diaryl oxide derivative. Any inert solvent conventionally employed for dispersing phenolic resinoids can be used for this purpose. Such solvents may be either liquids or solids at room temperature, so long as the latter can be liquified below about 100° C. Particular solvents include the lower alcohols, such as methanol, ethanol and propanol; glycols such as ethylene glycol, propylene glycol, diethylene glycol, tetraethylene glycol, dipropylene glycol, tripropylene glycol; ketones, such as methyl ethyl ketone, acetone; and other semipolar organic solvents such as dioxan, furfuryl alcohol, dimethyl formamide, dimethyl acetamide and the like organic solvents for phenolic resinoids. Mixtures of one or more of the above solvents with aromatic hydrocarbons such as for example benzene, toluene and zylene can also be used.

Regardless of the manner in which the fortified phenolic resin systems are prepared, the final products obtained by thermosetting the fortified system have superior properties with respect to flexibility, toughness, shock resistance, chemical resistance and temperature stability. Such resins may be used as binders in molding compositions, adhesives for laminates, or as protective surface coatings for metals.

Curing of the above described fortified resinoids is accomplished at temperatures from 130° C. up to 400° C. With the utilization of higher curing temperatures, e.g., above about 250° C., these resinoids can be cured without any catalyst. Preferably, however, a condensation catalyst is used. When a catalyst is used, temperatures from about 150° to 275° C. usually give satisfactory reaction rates. Temperatures within the range from about 180° to 220° C. are preferred. At the lower temperatures, the time required for a cure tends to become excessive. Above 300° C., the danger of overcuring the resin increases, i.e., passing that point at which additional curing of the resin is more than offset by simultaneous degradation of properties of the fused resin.

The condensation catalyst can be added directly to the fortified phenolic resin or to an organic solution thereof. Basic catalysts are preferred, but acid catalysts can also be used. Particular basic catalysts include the organic alkyl and aryl amines. Examples of the former materials are methyl amine, dimethyl amine, trimethyl amine, triethylene diamine, pyridine, aniline and the like. Finely divided inorganic catalysts such as alkali metal hydroxides, alkali metal carbonates, alkali metal silicates, alkali metal borates and alkali metal phosphates are also used.

The amount of catalyst required will vary. Generally, due to the high reactivity of the fortified resins, very little catalyst is needed for effective results. For most operations the amount of catalyst will vary within the range from about 0.01 to 2 percent by weight of the fortified resin solids depending upon the type of catalyst used and the temperature of cure. In varnish resins, it is, of course, desirable to utilize a catalyst soluble, or at least homogeneously dispersible, in the solvent medium.

When utilized in molding compositions, the fortified fusible phenolic resins of the invention are uniformly admixed with a desired filler such as, for example, wood flour, finely divided clay, asbestos or sand, with or without a catalyst. Usually, from about 20 to 70 percent by weight of the resin, based on the filler, is adequate for the manufacture of most molded articles.

The resulting molding compositions can be formed in any convenient manner such as by extrusion, injection molding and the like forming techniques. Temperatures used in the forming operations should be above the thermosetting temperature of the fortified resin, but below its decomposition temperature, or the decomposition temperature of the filler. Curing of the fortified resin-filler mixture is usually accomplished at temperatures within the range from 150° to 300° C. for a period of time ranging from less than a minute up to as much as one hour depending upon the pressure and temperature used, and such other considerations as the size of the body to be thermoset and the heat transfer efficiencies realized.

When the fortified phenolic resins of the invention are utilized for coatings, the phenolic resin system and the diaryl oxide derivative are uniformly dispersed in a suitable organic solvent medium. Generally, the solution will contain from about 5 to about 70 percent by weight resin solids. Such varnishes can be applied to substrates to be protected by dipping, brushing, rolling or spraying techniques. They are cured by baking the coated substrates at the fusing temperature of the resin.

The poly(alkoxymethyl) derivatives of diaryl oxide employed herein can be prepared by etherifying halo-methylated diaromatic ether compositions with a lower alkanol. The halomethylated diaromatic ethers are described in United States Letters Patent 2,911,380. A suitable alkanol is menthol, ethanol, propanol, or butanol. The alcohol is reacted with the halomethylated ethers in accordance with the Williamson ether synthesis. The etherification reaction is catalyzed by an alkali such as an alkali metal, alkali metal hydroxide or alkali metal carbonate.

Specific halomethylated diaromatic ethers used to prepare the corresponding akoxymethyl derivatives include mono(chloromethyl)diphenyl oxide, di(chloromethyl)diphenyl oxide, tri(chloromethyl)diphenyl oxide, tetra(chloromethyl)diphenyl oxide, mono(chloromethyl)ditolyl oxide, di(chloromethyl)ditolyl oxide, tri(chloromethyl)ditolyl oxide.

As prepared, the halomethylated diaromatic ether compositions are usually mixtures of isomers and homologs having varying numbers of halomethyl substituents per molecule. While such product mixtures can be separated to provide individual compounds which can be separately etherified and utilized in the present invention, the mixtures themselves are good starting materials for the preparation of the mixed alkoxymethyl diaromatic ether compositions which can also be used in the invention.

In preparing the alkoxymethylated diaromatic ethers, a preferred mode of operation involves adding an effective amount of an alkali metal such as sodium to a preformed mixture of the alcohol and the halomethylated diaromatic ether. The resulting composition is heated at an elevated temperature of at least about 60° C. under autogenous pressures. Higher temperatures up to 170° C. can be employed if desired. When the mixture is above its boiling point, the reaction is carried out in a pressurized system. A most convenient reaction temperature, however, is the reflux temperature of the mixture. The amount of alkali employed should be at least stoichiometrically equivalent to the halogen present in the halomethyl compound. Upper limits of alkali used are not critical. They are determined by economic and other practical considerations apparent to one skilled in the art. A preferred molar ratio of alkali to organic halogen is about 1.05:1.00.

As the alkali hydroxide is added to the alcohol-halomethylated diaromatic ether mixture, an exothermic reaction occurs which is sufficiently pronounced that care should be exercised to avoid adding the alkali too rapidly. At least enough alcohol is employed to react stoichiometrically with each available halomethyl group in the halomethylated diaromatic ether starting material. Preferably, at least about 3 and up to as much as 10 moles of the alkanol are employed for each chemical equivalent of halomethyl groups present. Larger amounts can be employed but it is generally uneconomical to do so.

While an effective amount of the desired product can be obtained within a few minutes after initial contacting of the reactants, it is usually desirable to continue the reaction conditions for as much as several hours in order to insure that a substantial proportion of the reactants is converted to the desired product. This is especially true if batch reaction techniques are being employed, but as will be readily apparent to one skilled in the art, continuous process in which the unreacted ingredients are continuously recovered and recycled to the reaction zone feed streams may utilize comparatively shorter contact times for effective operation.

Upon achieving a desired degree of conversion of the reactants to the desired ether product, the reaction mass is filtered to remove alkali halides that are formed during the reaction. Subsequently, the filtrate is heated at a reduced pressure to distill off any unreacted alkanol or other volatiles that may be present. The product thus recovered can be efficiently used as is in accordance with the present invention.

Applicants' invention is further illustrated in the following examples but the invention is not to be construed as being limited thereto.

EXAMPLE 1

A phenolic resin system was prepared by reacting 450 grams of 30 percent aqueous formaldehyde with 500 grams of a 80 percent-20 percent meta-cresol-paracresol mixture in the presence of about 25 milliliters of 25 percent ammonium hydroxide. The mixed reactants were heated at 85° C. for 105 minutes with mild agitation. Thereafter, the reaction system was cooled to 60° C. and dehydrated at a temperature of about 60° C. under a reduced pressure of about 50 millimeters mercury. The resulting, solid, partially condensed phenolic resin was characterized by a softening temperature of 55° C. Its stroke cure time was 64 seconds at 150° C.

A methoxymethyl diphenyl oxide isomer mixture having an average of about 1 methoxymethyl group per diphenyl oxide nucleus was prepared by etherifying chloromethylated diphenyl oxide isomer mixture containing 15 percent by weight chlorine. The reaction was carried out in excess methanol and in the presence of an amount of sodium hydroxide stoichiometrically equivalent to the chlorine content of the composition. The resulting product was stripped of the excess methanol by distillation under reduced pressure.

As a dry product, the resulting methoxymethyl diphenyl oxide isomer mixture contained approximately 5 percent 2-mono-ethoxymethyl diphenyl oxide, 43 percent 4-monomethoxymethyl diphenyl oxide, 11 percent 2,4-di(methoxymethyl)diphenyl oxide, 21 percent 4,4'-di(methoxymethyl)diphenyl oxide, 21 percent 4,4'-di(methoxymethyl)diphenyl oxide, 2 percent tri(methoxymethyl)diphenyl oxide, 0.5 percent tetra(methoxymethyl)diphenyl oxide. The compositions also contained about 17 percent unreacted diphenyl oxide. The percentages are based on the weight of the total composition.

One part of the above-prepared methoxymethyl diphenyl oxide composition was mixed with 4 parts of the dehydrated cresol-formaldehyde resin. A portion of the admixture was heated at 200° C. for about 30 minutes whereby a thermoset resin was obtained. It was a hard, translucent, slightly straw colored product which did not swell in ethanol, toluene, acetone or water.

An aluminum foil 0.0012 inch thick was coated with a 20 percent solution of a fortified cresol resinoid like that prepared above in cyclohexone. After curing the coating by heating at 200° C. to provide an insoluble, solvent resistant adhering film 0.0003 inch thick, the aluminum foil was wrapped around each of a series of mandrels of ¼", ³⁄₁₆", ⅛" and ¹⁄₁₆" diameter, respectively. The film did not flake or peel off the aluminum foil. Aluminum foil coated in a similar fashion with just the cresol-formaldehyde resin. When tested as described above, the film cracked and peeled off the foil.

EXAMPLE 2

In further operations, a second phenolic resin system was prepared by partially condensing 94 grams of phenol, 324 grams of meta-cresol, 28 grams of hexamethylene tetraamine and 533 grams of 36 percent aqueous formaldehyde. The foregoing mixture was heated at 100° C. for one hour with mild agitation. The resulting product was then held at 100° C. without agitation for an additional 30 minutes and cooled to 60° C. Water was distilled from the resinoid under a reduced pressure of about 40 millimeters of mercury at a temperature of 100° C. The solid resin was then dispersed in 100 grams of ethanol and heated to about 75° C. in order to accomplish complete solution of the resinoid.

One part of the above-prepared resinoid solution was mixed with 4 parts or the methoxymethyl diphenyl oxide isomer mixture prepared in Example 1. This mixture was then further diluted with sufficient acetone to produce a solution containing 20 percent by weight total fortified resin solids.

Copper strips were dip coated four times in the fortified resin solution with intervening cures after each coating at 200° C. for 30 minutes. Translucent, hard films were thus produced on the strips with a minimum of bubbles and voids. The strips were then bent through 180 degrees and the film inspected at the fold. There was essentially no cracking or popping. The coated copper strips were also wrapped around a ¼ inch mandrel. Again the film remained intact with visually complete adherence of the film to the metal surface.

Phenolic resins employed and tested in the foregoing manner, but without fortification with diaryl oxide derivatives undergo cracking and popping to the extent that in the bending and rolling tests, the coating flakes off the metal surface in substantial amounts.

What is claimed is:

1. A composition comprising one part of a soluble, fusible phenol-aldehyde resin fortified with from about 0.2 to 9 parts by weight of an alkoxymethyl diaryl oxide wherein the aryl group is an hydrocarbon of the benzene series and the alkyl group is a hydrocarbon having from one to four carbons, said diaryl oxide having an average of from one to four substituent alkoxymethyl groups.

2. The composition of matter otained by heating the composition of claim 1 at an elevated temperature within the range from about 150° C. to about 300° C. until an insoluble product is obtained.

3. A composition comprising an inert filler in admixture with from about 20 to 70 percent by weight of a resinous composition comprising one part of a soluble, fusible phenol-aldehyde resin fortified with from about 0.2 part to 9 parts by weight of a diaryl oxide wherein the aryl group is an hydrocarbon of the benzene series and the alkyl group is a hydrocarbon having from one to four carbons, said diaryl oxide having an average of from one to four substituent alkoxymethyl groups.

4. A composition obtained by heating the composition of claim 3 at a temperature within the range from about 130 C. to about 400° C. until an insoluble product is obtained.

5. A resinous composition comprising one part of a soluble, partial condensation product of a phenol and an aldehyde fortified with from about 0.2 part to 9 parts by weight of an alkoxymethyl diaryl oxide wherein the aryl group is an hydrocarbon of the benzene series and the alkyl group is a hydrocarbon having from one to four carbons, said diaryl oxide having an average of from one to four substituent alkoxymethyl groups.

6. A composition as in claim 5 wherein the alkoxymethyl diaryloxide is an alkoxymethyl diphenyl oxide having an average of from one to four substituent alkoxymethyl groups.

7. A solution comprising the composition of claim 6 dissolved in a semipolar organic solvent.

8. A resinous composition comprising one part of a soluble, fusible, intermediate condensation product of phenol and formaldehyde and from about 0.2 to 9 parts by weight of an alkoxymethyl diphenyl oxide having an average of from 1 to 4 substituent alkoxymethyl groups wherein the alkyl group has from 1 to 4 carbons.

9. A resinous composition comprising one part of a soluble, fusible, intermediate condensation product of cresol and formaldehyde and from about 0.2 part to 9 parts by weight of an alkoxymethyl diphenyl oxide having an average of from 1 to 4 substituent alkoxymethyl groups wherein the alkyl group contains from 1 to 4 carbons.

10. A method which comprises partially reacting:
(a) one part of a mixture consisting of a phenol and from about 0.6 to about 2.5 moles of an aldehyde per mole of the phenol, and
(b) from about 0.2 part to 9 parts of an alkoxymethyl diaryl oxide wherein the aryl group is an hydrocarbon of the benzene series and the alkyl group is a hydrocarbon having from one to four carbons, said diaryl oxide having an average of from one to four substituent alkoxymethyl groups, the partial reaction being achieved by heating the above mixture at a temperature within the range from about 60° to about 140° C. for a period of time sufficient to provide a homogeneous, intermediate, soluble and thermosettable resinoid.

11. A method as in claim 10 wherein the alkoxymethyl diaryl oxide is an alkoxymethyl diphenyl oxide having an average of from one to four substituent alkoxymethyl groups.

References Cited

UNITED STATES PATENTS

| | | | |
|---|---|---|---|
| 2,911,380 | 11/1959 | Doedens | 260—2.5 |
| 3,316,140 | 4/1967 | Sonnabend | 260—52 |
| 3,324,082 | 6/1967 | Sonnabend | 260—52 |

MORRIS LIEBMAN, Primary Examiner

L. T. JACOBS, Assistant Examiner

U.S. Cl. X.R.

260—59